United States Patent Office 3,268,627

Patented August 23, 1966

1

2

3,268,627

BLENDS OF ISOTACTIC AND SYNDIOTACTIC POLYPROPYLENE

Donald D. Emrick, Maple Heights, Ohio, assignor to The Standard Oil Company, Cleveland, Ohio, a corporation of Ohio No Drawing. Filed May 16, 1963, Ser. No. 281,012
10 Claims. (Cl. 260—897)

This invention relates to a novel polymer mixture comprising an intimate blend of a conventional isotactic alpha-olefin polymer and a crystalline syndiotactic alpha-olefin polymer.

It is well known to skilled artisans that high molecular weight or Ziegler-type isotactic polypropylenes have a highly crystalline character and higher softening points than normal polypropylene hitherto known. However, these new polypropylenes have inherently poor notched impact strength, and at room temperature and below, they are hard and even brittle and because of the relatively large size of the spherulitic crystalline domains they are or become opaque as fibers, films or molded articles prepared from them are cooled down to room temperature. One of the drawbacks of such low pressure polypropylene plastics has been their relatively poor performance at low temperatures. In particular, this has tended to limit their utility as a packaging material for frozen foods, wire and cable insulation, plastic pipe, etc.

It has been proposed to use plasticizers for high molecular weight isotactic polypropylene to improve the low temperature properties as disclosed in U.S. Patents Nos. 2,950,267, 2,967,164 and British Patent No. 824,289. Moreover, it has been proposed to improve the poor notched bar impact strength of high molecular weight isotactic polypropylene by blending it with cis-1,4-polybutadiene as disclosed in Belgian Patent No. 619,716. Also blends of high molecular weight isotactic polypropylene with isotactic polybutene-1 and with butyl rubber have been disclosed as having improved low temperature properties in Canadian Patents Nos. 633,823 and 641,533 respectively. Polypropylene-butyl rubber blends are also disclosed in U.S. Patent No. 2,939,860. Blends of high molecular weight, highly crystalline polypropylene with natural and SBR types of rubber are disclosed in British Patents Nos. 865,793 and 875,947. Cyclicized rubber and rubbery ethylene-propylene copolymers blended with crystalline polypropylene are disclosed in British Patents Nos. 829,148 and 835,864, respectively and polypropylene blends with silicone rubber and ethylene-vinyl acetate copolymers are disclosed in British Patent No. 841,070 and Belgian Patent No. 620,703, respectively.

The syndiotactic poly-alpha-olefins useful herein are those having at least 20% crystallinity wherein at least 50% of that crystallinity is of the syndiotactic type. Polymers of this type are readily prepared according to the process disclosed in the copending U.S. patent application of Donald D. Emrick and Roman Zorska, Serial No. 272,225, filed April 11, 1963.

The conventional isotactic poly-alpha-olefin useful herein must have at least 15% crystallinity by X-ray analysis and must be at least 80% insoluble in boiling n-heptane or isooctane. This polymer is typically characterized by a polypropylene having a molecular weight of about 50,000 to 500,000 (Harris correlation, J. Polymer Science 8, 361, 1952), a preferred X-ray crystallinity in the unoriented state of at least 45%, density of about 0.86 to 0.91 g./cc., high softening point (115°–145° C.), high melting point (125–175° C.), high tensile strength (1000 to 5500 p.s.i.), high rigidity at low temperature (1,000,000 to 6,000,000 p.s.i. at −50° C.), and poor low temperature brittleness below 0° C. This material, as is well known, can be prepared by polymerizing propylene at or near atmospheric pressure with the aid of a Ziegler polymerization catalyst, e.g., as described in Belgian Patent 538,782. For the sake of convenience the essential features of this known Ziegler-type polymerization process will be briefly recapitulated. The Ziegler catalyst is a solid insoluble reaction product obtained by reducing a reducible compound of a Group IVb–VIb or VIII heavy metal or manganese, etc., with a reducing organometallic compound of an alkali metal, alkaline earth, rare earth or zinc metal compound, or by reducing an appropriate metal compound with the aid of metallic aluminum, or a mixture of aluminum and titanium, etc. The preferred catalyst of this type is usually prepared by reducing one mole of a titanium tetrahalide, notably tetrachloride, to the corresponding trivalent or substrivalent titanium halide with about 0.2 to 6 moles of aluminum triethyl, triisobutyl) or other aluminum alkyl compound of the formula RR′AlX. In this formula R, R′ and X preferably are alkyl groups of 2 to 8 carbon atoms, although X may alternatively be hydrogen or a halogen, notably chlorine. The reduction is best carried out by dissolving each of the two catalyst components in an inert solvent, notably a $C_3$ to $C_{18}$ paraffin such as isopentane or n-heptane, and mixing the two solutions in the proper proportions at temperatures between 0° and 150° C. and in the absence of moisture, oxygen and sulfur impurities. The resulting precipitate with some free aluminum alkyl compound is generally considered to constitute the actual active polymerization catalyst. Consequently it has been considered best to carry out the catalyst preparation using only about 0.3 to 0.8 mole of aluminum alkyl compound per mole of titanium chloride, and then add a supplemental amount of the aluminum alkyl compound to the polymerization zone to raise the Al/Ti mole ratio therein to a value between about 1:1 and 3:1.

Propylene monomer is then contacted with the resulting catalyst in the presence of the inert hydrocarbon solvent such as isopentane, n-heptane, xylene, etc. The polymerization is conveniently effected at temperatures of about 0° to 100° C., and pressures ranging from 0 to 500 p.s.i.g. The catalyst concentration in the polymerization zone is preferably in the range of about 0.1 to 0.5% based on total liquid, and the polymer product concentration in the polymerization zone is preferably kept between about 2 to 25% based on total contents so as to allow easy handling of the polymerized mixture. The proper polymer concentration can be obtained by having enough of the inert diluent present or by stopping the polymerization short of 100% conversion, etc. When the desired degree of polymerization has been reached, a $C_1$ to $C_8$ alkanol such as isopropyl alcohol or n-butyl alcohol, desirably in combination with a chelating agent such as acetyl acetone is normally added to the reaction mixture for the purpose of dissolving and deactivating the catalyst and for precipitating the polymer product from solution. After filtration, the solid polymer may be further washed with alcohol or acid such as hydrochloric acid, dried, compacted and packaged.

The alpha-olefin polymers useful herein are the high polymers of alpha-olefins containing at least three carbon atoms and up to 8 carbon atoms and include such materials as propylene, butene-1, pentene-1, styrene and the like. The most preferred alpha-olefin in the present invention is propylene.

The mixtures of this invention are composed of from about 97 to 50% by weight of a conventional isotactic poly-alpha-olefin such as polypropylene and from about 3 to 50% by weight of a syndiotactic polypropylene.

Blends of other linear poly-olefins such as linear polyethylene with syndiotactic polypropylene are included herein but not preferred.

The preferred blend of isotactic and syndiotactic polypropylene of this invention may also contain up to about 20 weight percent of an amorphous or atactic polypropylene or a natural or synthetic rubber as an additional component. For the purpose of the present invention an amorphous or atactic polymer is one which contains less than 15% crystallinity as determined by X-ray analysis.

The blends of this invention exhibit excellent impact strength when compared with the impact strength of the isotactic polymer alone and only a moderate loss in structural properties occurs in the blends. More severe loss of structural properties occurs in well known blends of isotactic polypropylene with butyl rubber or amorphous atactic polymer, for instance as disclosed in SPE Journal, January 1961, pp. 83–86.

Improvement in impact strength at low temperatures occur in the instant blends and this is unexpected because it is known that blends of isotactic polypropylene with butyl rubber or atactic polypropylene perform poorly at low temperatures.

One of the outstanding advantages of the polymer blends of the present invention is their freedom from surface crazing or blushing upon repeated flexure, an objectionable feature normally associated with so-called high impact polypropylene which are blends of a rubber such as butyl rubber or atactic polypropylene with isotactic polypropylene. This crazing or blushing can be a severe drawback in certain articles of commerce, as for example, in blow-molded bottles and integral hinges prepared from high impact polypropylene. The blend compositions of the present invention remain clear and do not become opaque on bending or twisting, an advantage most apparent in unpigmented articles.

Crazing or blushing in conventional high impact polypropylene, for instance, is probably caused by incompatibility or phase separation between the amorphous phase and the crystalline phase of the blend. A blend of isotactic polypropylene and syndiotactic polypropylene on the other hand, because of its greater crystallinity and because it is composed only of polypropylene is therefore more homogeneous, does not craze, and has unexpectedly good impact strength.

It is to be understood that, depending on the desired properties of the end product, various fillers, organic and inorganic pigments, dyes, stabilizers, antioxidants and the like may be compounded into the blends of this invention without departing from the scope of this invention.

The syndiotactic polypropylenes useful in the blends of this invention may be prepared in any known manner, for instance, by polymerizing propylene in the presence of organometallic coordination catalyst composed of lithium aluminum alkyl hydride, titanium tetrachloride and a triaryl phosphine. The polymerization reaction may be carried out at temperatures generally above 0° C. and up to about 50° C., at olefin partial pressures of about 1 to 10 atmospheres. A more detailed description of this type of polymerization process is more fully disclosed in the aforementioned copending U.S. patent application.

Unoriented, smectic-free, crystalline polypropylene of syndiotactic structural stereoregularity exhibits strong X-ray reflections corresponding to lattic distances of about 7.3 A. and 5.3 A.; whereas unoriented, crystalline polypropylenes of isotactic structural stereoregularity exhibit, among others, strong reflections corresponding to 6.3 A. and 4.8 A. In the absence of orientation of the smectic allotropic form, reflections corresponding to these lattice distances were considered to be sufficiently strong, sufficiently independent, and sufficiently characteristic of normal syndiotactic and isotactic crystallinity to be of use in estimating the relative amounts of these stereo-isomers in a given polypropylene. The use of both the $d=5.3$ A. (corrected for the relative intensity occurring in isotactic crystalline polymer) and $d=7.3$ A. reflections rest largely on the published observations of Weidinger and Hermanns (Makromol. Chem. 50, 98–115, 1961). Because the relative intensity of individual crystalline polypropylene peaks fluctuate rather considerably from one sample to another for different relative degrees of tacticity, probably because of polymorphism, it is therefore believed that the utilization of several peaks to estimate the percent syndiotacticity would yield more satisfactory results. Addink and Bientema have observed that in oriented samples the reflection of $d=7.3$ A. relative to other crystalline peaks increases with decreasing over-all crystallinity while the peak at $d=5.3$ A. increases in intensity with increases in crystallinity.

The following is a discussion of the method used in the estimation of relative syndiotacticity in polypropylenes. X-ray diffractograms were obtained on samples prepared by a casting, pressing technique as perfectly flat surfaces in a 10 mm. x 20 mm. x 1 mm. cavity of a Phillips X-ray specimen holder at or above the melting point of the polymer (165 to 200° C.) and then cooling to room temperature. A scintillation counter was used as the detector for the nickel-filtered copper K alpha-radiation. The resulting X-ray diffractograms were treated in the manner used by A. Weidinger and P. H. Hermanns, particularly with regard to the construction of the background curve, the procedure being essentially the same as that of Natta and his coworkers in G. Natta, P. Corradini and M. Cesari, Atti. Accad. Nazl. Lincei. Rend., 22, No. 1, 11–17 (1957). Briefly, the maximum of the background was taken to lie at the same angle of diffraction as that in the diffraction curve of an entirely amphorous sample. The background curve is then constructed. Only samples which were obviously free of or nearly free of the smectic allotropic modification or significant orientation were evaluated.

The appropriate Lorenz and polarization correction factors were multiplied by individual crystalline reflection surface areas represented by the designation I to obtain factors for the various significant reflections corresponding to lattice distances of about 7.3 A., 6.3 A., 5.3 A., 4.8 A. The correction factor for lattice distances of 7.3 A. was 2.15; for 6.3 A., 3.06; for 5.3 A., 5.18; and for 4.8 A., 6.98. For very highly or 100 percent syndiotactic polypropylene the following formula is derived:

$$\frac{2.15I_{d=7.3\text{ A.}}+518I_{d=5.3\text{A.}}}{2.15I_{d=7.3\text{ A.}}+3.06I_{d=6.3\text{ A.}}+5.18I_{d=5.3\text{ A.}}+6.98I_{d=4.8\text{ A.}}}=F_s=1.00$$

From data for the most highly isotactic polymers available from various preparational procedures, it was decided to use the derived value of $F_s=0.186$ as the value of a hypothetical 100 percent isotactic polymer; and this value was used as a correction factor arising from the $d=5.3$ A. contribution of isotactic polypropylene which must be considered when 5.3 A. is used to determine the relative syndiotacticity.

Since:

$$\frac{2.15I_{d=7.3\text{ A.}}+5.18I_{d=5.3\text{ A.}}}{2.15I_{d=7.3\text{ A.}}+3.06I_{d=0.3\text{ A.}}+5.18I_{d=5.3\text{ A.}}+6.98I_{d=4.18\text{ A.}}}-0.186=F_s-0.186=0.814 \text{ for "100\% syndiotactic polymer"}$$

Therefore:

$$\frac{\dfrac{2.15I_{d=7.3\text{ A.}}+5.18I_{d=5.3\text{ A.}}}{2.15I_{d=7.3\text{ A.}}+3.06I_{d=6.3\text{ A.}}+5.18I_{d=5.3\text{ A.}}+6.98I_{d=4.8\text{ A.}}}-0.186}{0.814}\times 100=\frac{F_s-0.186}{0.814}\times 100=$$

percent syndiotactic crystallinity (approximately)

The higher the "$F_s$" number, the higher the syndiotacticity of the polymer.

ESTIMATION OF CRYSTALLINITY

The following equation of Natta and co-workers was used for the estimation of crystallinity wherein $I_{cryst.}$ is the corrected area of the crystalline peak in the X-ray diffractogram, $I_{amorph.}$ is the corrected area of the amorphous halo in the X-ray diffractogram and K is taken to equal 0.9 according to Natta:

$$\text{Percent cryst.} = \frac{I_{cryst.}}{I_{cryst.} + KI_{amorph.}} \times 100$$

$$\text{Percent cryst.} = \frac{100 \times 2.15I_{d=7.3\,A.} + 3.06I_{d=6.3\,A.} + 5.18I_{d=5.3\,A.} + 6.89I_{d=4.8\,A.} + 10.30I_{d=4.2\,A.}}{2.15I_{d=7.3a.} + 3.06I_{d=6.3\,A.} + 5.18I_{d=5.3\,A.} + 6.89I_{d=4.8\,A.} + 10.30I_{d=4.2\,A.} + 0.9\ (6.9)\ Am}$$

The following example will illustrate the compositions of this invention.

EXAMPLE

Syndiotactic polypropylenes were prepared by the following procedure: a three-necked 5000 ml. capacity flask was fitted with stirrer, self-sealing rubber serum ampoule cap, a Claisen connecting tube, a reflux condenser, and means for adding gaseous pure nitrogen and pure propylene, as well as a gas exit bubbler at the top of the reflux condenser. The flask was externally cooled by means of a water-cooled bath. To the flask was added 3000 ml. of dry cyclohexane and then under a pure nitrogen atmosphere were successively added 190 ml. of 0.22 M $$LiAl(C_{10}H_{21})_3H$$

(in Tetralin), 3.84 mls. (0.0349 mole) of pure titanium tetrachloride, and 182 mls. of 0.192 M $(C_6H_5)_3P$ (in toluene). Contact was established with gaseous C.P. propylene, with stirring, and was continued at ambient room temperature for 22 hours, the propylene absorption having stopped completely before the end of this interval. Isolation by the usual technique yielded 159.4 grams of dry polymer (A). The isolation step consisted of treating the crude polymeric product with concentrated hydrochloric acid in isopropanol (1 part in 40) followed by washing the precipitate with isopropanol and acetone and drying the purified polymer. The crude polymer (substantially free of orientation and smectic modification) displayed an X-ray crystallinity of about 28.9% and an X-ray diffractogram $F_s - 0.186 = 0.635$, corresponding to about 79% of the total crystallinity occurring as syndiotactic crystallinity. Polypropylenes B, C, D, E and F were also prepared in the foregoing manner and they had the following properties:

| Polypropylene | Percent Crystallinity | Percent Syndiotacticity |
|---|---|---|
| B | 26.9 | 62 |
| C | 26.5 | 64 |
| D | 30.2 | 82 |
| E | 30.0 | 57 |
| F | 31.0 | 66 |

A summary of the physical properties of blends of syndiotactic polypropylene, atactic polypropylene and butyl rubber with commercial isotactic polypropylenes is given in Tables I–IV inclusive. Standard notched Izod impact strengths, yield tensile strengths, flexural modulus, percent elongation, brittle temperature, and melt indices are compared. All of the tests employed were standard ASTM tests with the exception of the determination of the brittle temperature. This test consisted of determining the temperature at which 50% of the bars (dimension ½" x ⅛" cross sectional area) would break when subjected to severe bending stress. The ASTM test method designations for the other tests are:

| | |
|---|---|
| Notch Izod impact strength | ASTM D256–56. |
| Flexural modulus | ASTM D790–59T–g. |
| Flexural yield strength | ASTM D790–59T–c. |
| Yield tensile strength and elongation | Modified ASTM D638–61t(2 in./min.; Instron; 5" x ½" x ⅛" bars). |

A blush test was carried out wherein an injection molded bar of the polypropylene (5" x ½" x ⅛") was subjected to severe stress bending (>90°). Samples which crazed or blushed became opaque and white in the general locality of the bend and upon returning the bar to its original dimensions a noticeable degree of permanent haze or opacity remained in the area of previous stress.

Blends were prepared by first dry mixing the required amount of syndiotactic polypropylene with 1% by weight of an inhibitor composed of 1 part of tetraphenyl tin, 1 part of a sterically hindered bis phenol antioxidant (American Cyanamid Antioxidant 2246) and 9 parts of dilauryl beta,beta'-thiodipropionate. Next the required amount of conventional isotactic polypropylene was dry mixed with the foregoing mixture and then the total mixture was mixed on a differential rolling mill having a roll temperature of about 330° F. for a period of 10 to 15 minutes.

*Table I*

| Polymeric Material | Izod Impact Strength, ft.-lb./in. Notch R.T. | Shore D Hardness | Blush Test | Yield Tensile Strength, p.s.i. | Flexural Yield Strength, p.s.i. | Flexural Modulus, p.s.i. | Tensile Impact Strength, ft.-lb./in.² |
|---|---|---|---|---|---|---|---|
| Commercial Isotactic Polypropylene (Eastman Tenite 4231A). | 0.49 | 68 | No Blush | 4,540 | 5,905 | 173,000 | 75 |
| Above containing 10% Enjay Butyl Rubber. | 1.36 | 63 | Blushed | 3,637 | 4,610 | 135,000 | 108 |
| Tenite 4231A containing 10% Polymer E. | 0.92 | 68 | No Blush | 4,360 | 6,300 | 178,000 | 81 |

*Table II*

| Polymeric Material | Izod Impact Strength, Ft. Lb./In. Notch | | Yield Tensile Strength, lb./in.²; 2 In./min. | Percent Elongation | Tensile Impact Strength, ft./lb./in.² | Brittle Temp., ° F. | Blush Test | Flexural Modulus p.s.i. |
|---|---|---|---|---|---|---|---|---|
| | Room Temp. | −40° C. | | | | | | |
| Isotactic polypropylene (Hercules Pro-fax 6511) | 0.70 | 0.29 | 4,865 | 116 | 81 | −1 | No Blush | 204,000 |
| Above containing 15% mixture of polymers A+B+C+D* | 2.5 | | 3,780 | 706 | | −7 | do | 110,000 |
| Pro-fax 6511 containing 20% mixture of polymers A+B+C+D* | 2.6 | 0.32 | 3,905 | 223 | 143 | | do | 149,000 |

*A composite mixture of polymers A+B+C+D, 28% crystalline, 72% of the crystallinity as syndiotactic crystallinity.

*Table III*

| Polymer Composition | Izod Impact Strength, ft.-lb./in. Notch | Yield Tensile Strength, lb./in.²; 2 in./min. | Percent Elongation | Blush Test | Tensile Impact Strength, ft.-lb./in.² | Flexural Modulus, p.s.i. |
|---|---|---|---|---|---|---|
| A commercial high impact polypropylene composed of about 94% of isotactic polypropylene, about 3% of atactic polypropylene and about 3% of polyisobutylene. | 2.3 | 3,500 | 300 | Blushed | 116 | 150,000 |
| Above containing 20% mixed Polymers A+B+C+D.* | 12.8 | 3,180 | 412 | Slight Blushing | 155 | 114,000 |

*A mixture of Polymers A+B+C+D, 28% crystalline, 72% of the crystallinity as syndiotactic crystallinity.

*Table IV*

| Polymer Composition | Izod Impact Strength, ft.lb./in. Notch R.T. | Yield Tensile Strength, lb./in.²; 2 in./min. | Percent Elongation | Blush Test | Tensile Impact Strength, ft.-lb./in.² | Flexural Modulus, p.s.i. |
|---|---|---|---|---|---|---|
| Commercial isotactic polypropylene, Spencer 14. | 1.356 | 4,840 | 91 | No Blush | 148 | 178,000 |
| Above containing 6.5% Polymer F | 3.36 | 3,983 | 319 | do | 152.5 | 156,000 |
| Spencer 14 containing 6.5% atactic polypropylene. | 4.03 | 4,000 | 195 | Blushed | 210.2 | 157,000 |
| Spencer 14 containing 6.5% butyl rubber | 7.04 | 3,873 | 245 | do | 201 | 147,000 |

I claim:

1. The composition comprising an intimate blend of from about 50 to 97% by weight of a crystalline isotactic polymer of an alpha-olefin containing from 3 to 8 carbon atoms and from about 3 to 50% by weight of a crystalline syndiotactic polymer of an alpha-olefin containing from 3 to 8 carbon atoms, said syndiotactic polymer being prepared by the polymerization said alpha-olefin in the presence of an organometallic coordination catalyst composed of lithium alkyl hydride, titanium tetrachloride and a triaryl phosphine.

2. The composition of claim 1 wherein the alpha-olefin is propylene.

3. The composition of claim 2 wherein the crystalline isotactic polymer of propylene is at least 15% crystalline and at least 80% insoluble in boiling n-heptane.

4. The composition of claim 3 wherein the crystalline syndiotactic polymer of propylene is at least 20% crystalline and at least 50% of this crystallinity is due to the syndiotactic structure.

5. The composition of claim 4 wherein the density of the polymers of propylene is from 0.86 to 0.91 g./cc.

6. The process for preparing a non-crazing, impact resistant, crystalline polymer of an alpha-olefin comprising blending intimately from about 50 to 97% by weight of a crystalline isotactic polymer of an alpha-olefin containing from 3 to 8 carbon atoms and from about 3 to 50% by weight of a crystalline syndiotactic polymer of an alpha-olefin containing from 3 to 8 carbon atoms, said syndiotactic polymer being prepared by the polymerization of said alpha-olefin in the presence of an organometallic coordination catalyst composed of lithium alkyl hydride, titanium tetrachloride and a triaryl phosphine.

7. The process of claim 6 wherein the alpha-olefin is propylene.

8. The process of claim 7 wherein the crystalline isotactic polymer of propylene is at least 15% crystalline and at least 80% insoluble in boiling n-heptane.

9. The process of claim 8 wherein the crystalline syndiotactic polymer of propylene is at least 20% crystalline and at least 50% of this crystallinity is due to the syndiotactic structure.

10. The process of claim 9 wherein the density of the polymers of propylene is from 0.86 to 0.91 g./cc.

References Cited by the Examiner

Natta et al.: Atti. Accademia Nationale Dei Lincei, Series 8, vol. 28, pp. 539–544, May 1960, in "Collection of Original Papers by Natta et al.," VII, Paper No. 212.

MURRAY TILLMAN, *Primary Examiner.*

E. B. WOODRUFF, *Assistant Examiner.*